May 19, 1925.

F. K. VREELAND

STRAY ELIMINATION IN RADIORECEIVERS

Filed Aug. 6, 1919  3 Sheets-Sheet 1

Inventor
Frederick K. Vreeland
By his Attorney
Frank L. Dyer

May 19, 1925.

F. K. VREELAND 1,537,975

STRAY ELIMINATION IN RADIORECEIVERS

Filed Aug. 6, 1919  3 Sheets-Sheet 2

Inventor
Frederick K. Vreeland
By his Attorney
Frank L. Dyer

May 19, 1925.

F. K. VREELAND

1,537,975

STRAY ELIMINATION IN RADIORECEIVERS

Filed Aug. 6, 1919

Inventor
Frederick K. Vreeland,
By his Attorney
Frank L. Dyer

Patented May 19, 1925.

1,537,975

UNITED STATES PATENT OFFICE.

FREDERICK K. VREELAND, OF MONTCLAIR, NEW JERSEY.

STRAY ELIMINATION IN RADIORECEIVERS.

Application filed August 6, 1919. Serial No. 315,651.

*To all whom it may concern:*

Be it known that I, FREDERICK K. VREELAND, a citizen of the United States, residing at Montclair, county of Essex, State of New Jersey, have invented certain new and useful Improvements in Stray Elimination in Radioreceivers, of which the following is a specification.

The invention herein described relates to an improvement in receiving system for radio intelligence, whereby interference by strays, atmospheric or artificial, is eliminated or minimized.

In my U. S. Patent No. 1,315,584, I have described a receiving system including among other features a baffle circuit which permits the ready passage of impulses of signal frequency but opposes the passage of strays, combined with a by-pass element or elements whereby stray impulses are diverted from the receiver and dissipated.

In my U. S. Patent No. 1,407,103, I have described a system including an intensity selector in combination with a baffle circuit whereby the diversion of strays and undiminished reception of signal impulses is promoted.

The present invention utilizes the basic principles of the former applications together with additional features directed particularly to the elimination of atmospheric strays of sudden, impulsive character. I desire also to claim specifically certain features that were set forth in the former applications but not specifically claimed.

A complex system such as that described in the first named patent, including a plurality of baffle elements each tuned to the signal frequency, combined with a plurality of by-pass elements, the parts being suitably proportioned in the manner set forth, is highly effective in transmitting freely currents of a given frequency and in diverting and absorbing the energy of currents of other frequencies. To secure sharp discrimination between different frequencies, the impedance of the by-pass should be small with respect to the capacity and inductance reactances of the baffle elements. The by-pass impedance may be either a pure resistance, a capacity reactance or an inductance reactance, or a combination of these. If the by-pass reactance is made too large, the system will transmit frequencies on either side of the signal frequency. On the other hand, the by-pass impedance is made larger than the equivalent resistance of the shunted portion to prevent undue shunting of the signal impulses. The system is thus highly effective in excluding interference from signals of foreign frequency, and largely effective in excluding atmospheric strays.

The use of an intensity selector in the by-pass element, as set forth in the second patent above named, greatly increases the efficacy of the by-pass in diverting atmospheric strays, and makes it possible to reduce the number of baffle elements and by-pass elements.

The improvement of the present invention still further increases the efficacy of the apparatus, particularly in the very difficult feature of eliminating the most persistent type of strays, namely, those sudden transitory impulses of large intensity and very short duration, which produce what are commonly called "clicks" or "crashes" by radio operators. Strays of this type are difficult to eliminate, first, because of their relatively large amplitude, and second, because of their abruptness and short duration. While not so noisy as the less intense grinding strays, they are far more difficult to control because of their property of exciting shock oscillations in a tuned circuit, irrespective of its frequency.

By the use of the present invention this tendency to shock oscillations is rendered innocuous, and the apparatus is greatly simplified. I have found that in a suitably designed system embodying the present invention, a single baffle element and a single intensity selector are sufficient, though additional baffle elements and by-pass elements may obviously be employed if desired.

In the present invention I take advantage of the fact that strays, particularly those of the character referred to, produce shock oscillations in the system and by so arranging the apparatus that the shock oscillations so set up shall be of a different frequency from the signal oscillations and providing means whereby such shock oscillations of different frequency may be separated from the signal oscillations, I am enabled in a very effective way to eliminate atmospheric strays.

In carrying out the present invention the shock oscillations of a frequency different from the signal frequency will be excluded by the frequency selective element of the system, and their energy absorbed by intensity selective means which operates more strongly on the stray oscillations than on the signal impulses, and at the same time guards the frequency selective element against excessive potential differences.

The conversion of shock energy into oscillations of non-signal frequency may be accomplished by partial de-tuning of some portion of the receiving system. One means of accomplishing this is fully described in an application for Letters Patent filed on even date herewith Serial No. 315,650. By means of the present invention, however, I am able to provide a channel for converting and dissipating the energy of strays at non-signal frequency without affecting the tune of the signal circuit or impairing its resonance and selectivity.

The means employed to accomplish this result preferably include a reactive by-pass, whereby such shock oscillations as may be produced are given a frequency different from the signal frequency, so that the baffle circuit readily distinguishes between such shock oscillations and signal impulses, an intensity selector so related to the by-pass as to be peculiarly effective in absorbing the energy of such shock oscillations and protect the baffle circuit from excessive potential differences, and a baffle circuit of such stiffness or energy storing capacity as to be highly effective in excluding strays, particularly those of sharp intensity and short duration.

In carrying out the present invention I utilize the fact that signal impulses are periodic and, in the best modern apparatus, sustained over a considerable number of oscillation periods, even in systems employing damped wave radiation, whereas the strays that are most troublesome are of very short duration, and their energy is usually concentrated in a single impulse or at most in a strongly damped wave. The receiver oscillations produced by signal waves are therefore the result of repeated increments of energy from the successive signal waves, which produce a cumulative effect in building up an oscillation in a tuned receiver circuit. In the case of impulsive strays, on the other hand, practically the entire energy is concentrated in a single impulse. To aid in discriminating between these different types of impulses I employ a baffle circuit having a large energy storing capacity compared to that of the collecting system, so that the energy taken up by the collector from a transitory stray impulse will have a relatively small effect on the baffle circuit, while the energy of a signal impulse, being distributed over a number of successive waves, produces a relatively large comulative effect. With such a baffle circuit I combine a by-pass element having a reactance that is small compared to the reactances of the baffle circuit, and so does not appreciably affect its period of oscillation, but which is sufficiently large with respect to the reactances of the collector system to modify the natural frequency of this system, making it, with the by-pass reactance included materially different from that of the baffle circuit. The energy taken up from a stray impulse therefore will be shunted off through the by-pass where it will expend itself in oscillations of a frequency different from the signal frequency, and will be absorbed by the intensity selector.

Figure 1:
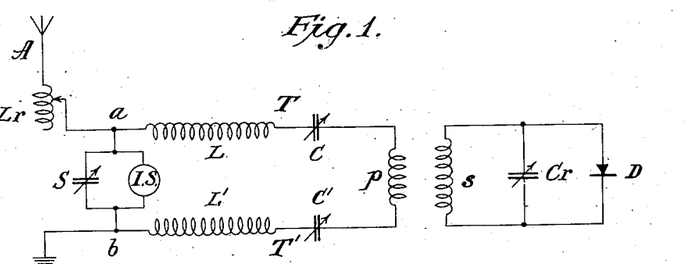
Fig. 1 shows an embodiment of the invention as applied to an ordinary receiving antenna, including a by-pass having a capacity reactance.

Referring to Fig. 1, A is a collector which is here shown as an ordinary antenna, with loading coil $L_r$, whereby its period of oscillation is adjusted to the signal frequency. It will be readily understood that if the natural frequency of the antenna is lower than the signal frequency, a capacity will be employed instead of the inductance $L_r$, the purpose being so to adjust the antenna that the points $a$, $b$, shall be points of small potential difference at the signal frequency. A baffle circuit is connected at the points $a$, $b$, and includes the baffle elements T, T', each comprising an inductance L, L', and a capacity C, C', together with the primary $p$ of a coupling transformer $p$, $s$, whose secondary is included in the receiving circuit proper. The receiving circuit is shown in simple conventional form including an oscillation capacity $C_r$ and a detector D, which may be of any desired type, it being understood that it is not the purpose of the present invention to set forth any particular form of receiver circuit or detector. The baffle circuit is tuned to the signal frequency and it is preferably made symmetrical, the inductance L and capacity C being similar respectively to the inductance L' and capacity C', though a single inductance and a single capacity may be employed if desired. The inductance and capacity reactances are made large at the signal frequency, so that the baffle circuit is a stiff oscillator, having a large energy storing capacity compared to that of the collecting system. Since the collecting system and the baffle circuit are independently tuned to the signal frequency, the points $a$, $b$, will be points of small potential difference at this frequency, but will be points of large potential difference at any other frequency. Across these points $a$, $b$, is shunted a by-pass element which is here shown as comprising a capacity S and an intensity selector I. S. The reactance of the by-pass is made small with respect to the inductance and capacity reactances of the baffle circuit, so that it does not appreciably affect the natural period or impair the selectivity of the latter. It is, however, sufficiently large with respect to the reactances of the collecting circuit to give the system A, $L_r$, $a$, S, $b$, a natural frequency of oscillation materially different from the signal frequency.

The operation of the apparatus is as follows: A signal impulse impinging on the collector will set up oscillations of signal frequency in the circuit A, $L_r$, $a$, T, $p$, T', $b$. Since the capacity and inductance reactances are all balanced at the signal frequency the total impedance of this circuit will therefore be simply the equivalent resistance of the system. Hence signal impulses will pass through it freely, and the current will reach a considerable magnitude notwithstanding the large energy storing capacity of the system, because of the cumulative action of the successive waves. Since the baffle circuit and the collector circuit are individually tuned to the signal frequency, the potential difference between the points $a$, $b$, will be simply that required to overcome the equivalent resistance of the baffle circuit and receiving system. Since the impedance of the by-pass across the points $a$, $b$, is large with respect to this equivalent resistance there will be no material shunting or diversion of signal energy.

An impulse of other than signal frequency impinging on the antenna will encounter a large unbalanced reactance in the baffle elements T, T', which will make the points $a$, $b$, points of relatively large potential difference and the stray energy will be diverted to ground partly through the reactive element of the by-pass S, but mainly through the intensity selector I. S., which forms a path of relatively high conductivity under the influence of this potential difference.

A stray impulse of sudden and transitory character communicates energy to the collector which expends itself through the by-pass S. In so doing shock oscillations are produced of a frequency determined by the constants of the circuit A, $L_r$, $a$, S, $b$, which is different from the signal frequency. Since the energy storing capacity of this circuit is small compared with that of the stiff baffle circuit including the elements T, T', the tendency for current to escape through the latter will be small. This tendency is still further reduced by the operation of the intensity selector I. S. The stray energy passing through the reactive by-pass S will set up a potential difference across its terminals. Since the reactance of S is material with respect to the other reactances of the collector circuit, this potential difference will be sufficient to operate the intensity selector even though the intrinsic energy of the stray is small. The intensity selector in co-operation with its associated elements, especially the by-pass reactance S, thus acts preferentially in diverting, not only powerful strays, but also strays of much smaller energy than that of signal impulses which are not diverted.

Figure 2:
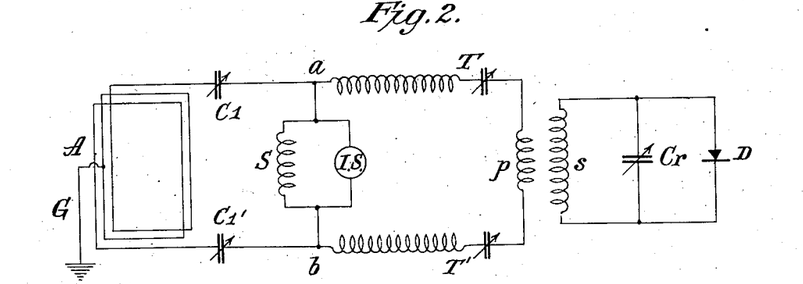
Fig. 2 shows an arrangement in which a loop collector is used, and including an inductive by-pass.

The principles of operation which characterize the simple arrangement of Fig. 1 may be embodied in a variety of different forms of apparatus. For example, Fig. 2 shows an arrangement in which a loop collector A is used in place of the simple antenna of Fig. 1. The inductance of this loop is balanced at the signal frequency by capacities $C_1$, $C'_1$. The baffle circuit, and the receiver circuit shown diagrammatically in its simplest form, are similar to those of Fig. 1. The by-pass S is here shown as having an inductance reactance instead of the capacity reactance shown in Fig. 1. The reactances of the collector A and capacities $C_1$, $C'_1$ are small with respect to the reactances of the baffle circuit as above outlined. The collector is preferably grounded at its middle point G, to avoid disturbing electrostatic effects. The operation of this arrangement is similar to that of Fig. 1. The frequency of shock oscillations will however be lower than the signal frequency instead of higher, since the by-pass contains an inductance instead of a capacity.

Figure 3:
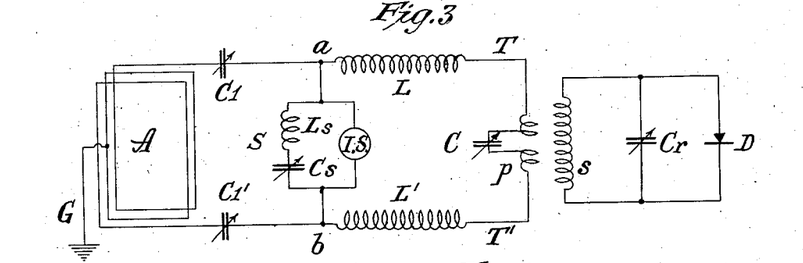
Fig. 3 shows an arrangement in which the by-pass contains both capacity and inductance.

It will be readily understood that the total reactance of the by-pass may be made up partly of a capacity and partly of an inductance. Such an arrangement is shown in Fig. 3, where the by-pass S includes an inductance $L_s$ and a capacity $C_s$. The inductance and capacity should be so chosen that their combined reactance is not zero at the signal frequency, but either the capacity or inductance preponderates. The resultant reactance should be large with respect to the equivalent resistance of the baffle circuit but small with respect to its reactances, as above explained.

Figure 4:
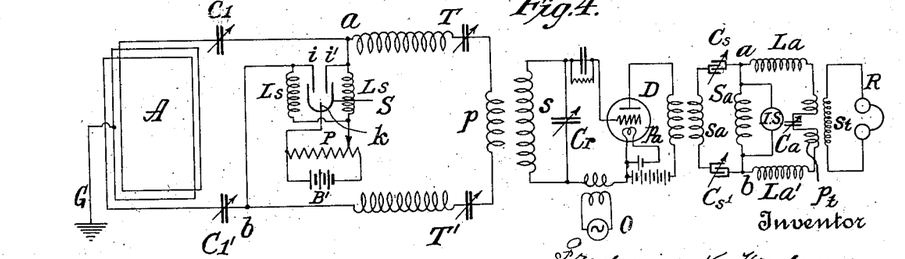
Fig. 4 shows a by-pass in which the intensity selector itself possesses the requisite capacity reactance. It shows also an application of the invention to currents of audio frequency. In all these figures, except Fig. 4, the intensity selector is indicated diagrammatically, for the sake of simplicity, as a circle marked "I. S.

Fig. 4 shows an arrangement in which the reactance of the by-pass is inherent in the intensity selector. The particular type of selector illustrated is an electrolytic cell S, having two small anodes $i$, $i'$ and a cathode $k$. This cell is polarized to the critical point by the battery B' acting through a potentiometer P. The anodes $i$, $i'$ are connected between the points $a$, $b$.

When the potential difference between these points is small the cell acts as a capacity, whose reactance can be given any desired value by suitably choosing the size of the electrodes. When the potential difference becomes great enough, however, to superpolarize the cell, its conductivity increases and it furnishes a by-pass of low impedance to such stronger impulses. When the self-capacity of the cell is utilized to furnish the by-pass reactance, the choke coils $L_s$ should have preferably a large reactance. If however the effective capacity of the cell is negligible the coils $L_s$ may be constructed to have the desired inductance reactance; or a combination of capacity and inductance reactances may be employed to produce the desired reactive by-pass effect. Other forms of electrolytic cell used as intensity selectors are set forth and described in full in my Patent No. 1,407,103, above mentioned.

The arrangement of Fig. 4 includes also an application of the invention to currents of audio frequency produced by passing the signal currents through a detector. The type of detector here shown is a thermionic bulb D connected across the capacity $C_r$ of the receiver circuit in the usual way. O is a local oscillator or other source of alternating current of frequency slightly different from the signal frequency which is used in the reception of undamped waves by the beats method. When spark signals are being received the local generator O is not required. It will be understood that the detector D may be made self-oscillating in the well known way, in which case also the separate oscillator O will not be required. The anode circuit of the detector includes the primary $p_a$ of a transformer $p_a$, $s_a$ whereby the audio frequency currents are applied to a baffle circuit including the inductance $L_a$, $L_a'$ and the capacity $C_a$. The inductance of the secondary $s_a$ is balanced by the capacities $C_s$, $C_s'$, making the points $a$, $b$, points of small potential difference at the signal audio frequency. A by-pass $S_a$ and intensity selector I. S. are shunted across the points $a$, $b$. The capacity $C_a$ of the baffle circuit is inserted for convenience between the halves of the primary $p_t$ of the telephone transformer $p_t$ $s_t$.

It will be noted that when operating on audio frequencies the electromotive element, through which signal energy as well as stray energy is supplied to the separating apparatus, does not include directly the antenna or loop collector or other means for absorbing signal energy from space, but receives the electromotive impulses in a form modified by the detector and transmits them to the separating and receiving apparatus. In the particular arrangement shown in Fig. 4 the electromotive element is connected through the transformer $p_a$, $s_a$ to the anode of the detector. The term "electromotive element" as used herein includes broadly means whereby the electromotive impulses are communicated to the rest of the apparatus. The word "baffle-element" as used herein includes broadly means offering discriminating opposition to the passage of non-signal impulses.

In Figs. 1 to 4, inclusive, the intensity selector, connected across the points $a$, $b$, is indicated diagrammatically by a circle marked "I. S," to avoid undue complication of the diagram. There are a number of forms of intensity selector that may be used effectively in these various arrangements. Several of these are shown in Figs. 5 to 9 inclusive. In each of the latter diagrams the letters $a$, $b$, indicate the points of connection whereby the selector may be introduced in the circuit arrangements of Figs. 1 to 4 at the points correspondingly marked.

In my Patent No. 1,407,103, I have described and illustrated several forms of intensity selectors comprising electrolytic cells, either sensitized by a polarizing battery, or used without initial polarization. In Fig. 4 of the present case I have illustrated another arrangement that I have found effective, including a single cell having two small anodes $i$, $i'$ and a common cathode $k$. The anodes are polarized to a point near the critical point by a battery B' adjusted by the potentiometer P. Short circuiting of the cell is prevented by choke coils $L_s$, whose impedence may be made so large that it does not materially modify the apparent capacity reactance of the cell, or otherwise adapted to the cell reactance, as already explained. When the anodes $i$, $i'$ are connected across the points $a$, $b$, any difference of potential will tend to superpolarize one or the other of the anodes, causing the conductivity of the cell to increase and act as a by-pass.

Figure 5:
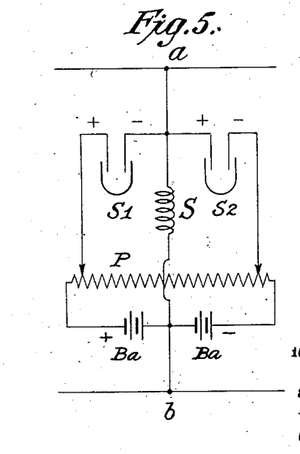
" Figs. 5, 6, 8, 9, and 10 show various forms of intensity selector that may be employed in the various arrangements illustrated in the foregoing diagrams.

Another arrangement of electrolytic cell that I have found effective is shown in Fig. 5. Here two cells $S_1$, $S_2$ are employed, having small electrodes, which are rendered asymmetrical by polarization set up by the battery $B_a$ through the potentiometer $P_a$. The middle point of the battery is connected to the point $b$, and the junction point of the two cells to the point $a$. The cells are thus polarized in opposite senses so that they act as by-passes to potential differences of opposite polarities. The by-pass reactance S is shown connected in parallel with the cells.

In this arrangement the polarizing electromotive force is balanced against the counter electromotive force of the cell in the circuit from $a$ to $b$, the balance being maintained through the inductive shunt S. Any potential difference across the terminals will tend to break down one or the other cell.

There are many other devices besides electrolytic cells which possess the intensity selective property. For example, certain forms of crystal contacts, such as carborundum, silicon, etc., while not showing the sharply defined critical point of the electrolytic cell, nevertheless show a decided increase in conductivity with increasing potential differences, particularly if sensitized by a local electromotive force. Such contacts may be constructed with fairly high conductivity by the use of large contact surfaces.

Figure 6:
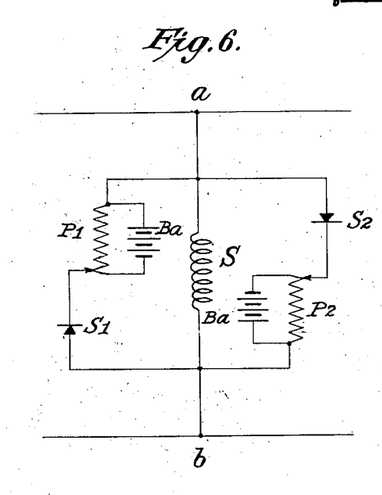

Fig. 6 shows a typical arrangement using crystal contacts. $S_1$ and $S_2$ are the contacts, connected in opposite senses with relation to the points $a$, $b$, and $B_a$, $B_a$ are their respective polarizing batteries, and $P_1$ $P_2$ adjusting potentiometers. The by-pass reactance is again shown at S.

A device that I have found peculiarly sensitive and effective as an intensity selector is a thermionic valve properly constructed and operated, and comprising a hot cathode, emitting electrons, and a suitable anode, enclosed in a sealed container. I prefer to use a bulb containing a certain amount of residual gas, argon being preferable because of its relatively low ionization voltage, the high conductivity which it imparts to the bulb, and the very sharply defined critical point of its characteristic. When an electromotive force below a given value is applied to the bulb only a very minute current flows, but when this electromotive force reaches a certain definite value the current increases enormously and the conductivity of the bulb becomes relatively very high. By adjusting the electromotive force of the sensitizing battery $B_a$ to a point just below this critical point the device becomes an exceedingly sensitive intensity selector, and a very small additional electromotive force applied by strays through the terminals $a$, $b$, will cause its conductivity to increase enormously, thus shunting and absorbing the strays.

Figure 7:
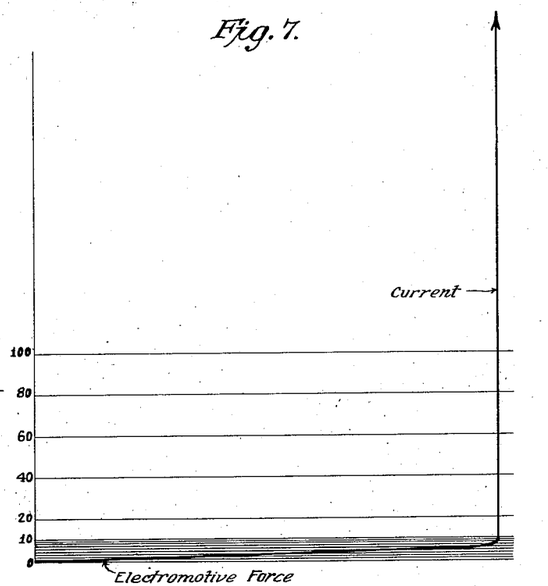
Fig. 7 is a typical characteristic curve of one form of intensity selector.

Fig. 7 shows a typical characteristic curve of such a bulb, the applied electromotive forces being represented by abscissas and the corresponding currents by the ordinates. In the case illustrated an increase of electromotive force of only one-tenth volt produces an increase of current from 8 microamperes to over 5000 microamperes, and the critical point is very sharply defined. The upper part of the curve is omitted in the figure. This characteristic makes such a bulb a highly efficient intensity selector.

Figure 8:
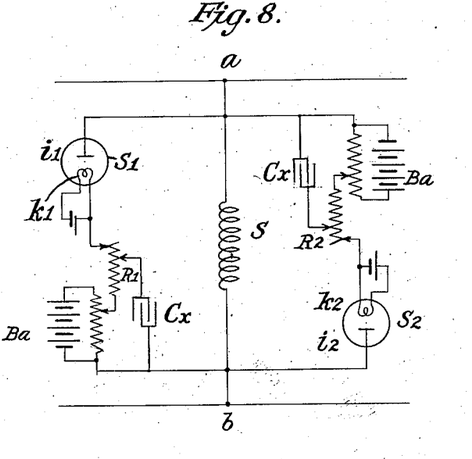

Fig. 8 shows a typical circuit arrangement of such a selector. The two selector bulbs $S_1$, $S_2$ are oppositely connected, each in series with a battery $B_a$ with suitable adjusting means, whereby the potential difference is maintained just below the critical point of the curve.

Under some conditions the bulb has a negative characteristic above the critical point, in which case it is desirable to use a positive resistance $R_1$, $R_2$ in series with it, to prevent instability. By suitably adjusting this resistance the apparatus may be made highly sensitive to small voltage increases and at the same time possessing a degree of stability which causes it to return at once to its normal condition when the excess voltage is removed.

In some cases it is desirable to shunt the battery $B_a$ and resistance $R_1$ or $R_2$, in whole or in part, by a condenser $C_x$ shown.

While I do not wish to confine myself to any theory of operation, it may be explained that on low voltages the conductivity of the bulb is due almost entirely to electrons emitted by the hot cathode. When the applied electromotive force reaches a certain critical point however the velocity attained by these electrons becomes great enough to ionize the gas, setting free both negative and positive ions in large numbers, thus partially neutralizing the space-charge effect of the negative electron cloud and greatly increasing the conductivity of the bulb.

The point at which this ionization by collision occurs and the extent of the ionization depend upon the nature of the gas and its pressure. In the case of argon the critical electromotive force is in the neighborhood of 12 volts.

This arrangement is exceedingly sensitive, and requires care in proportioning the various constants of the system to obtain the highest sensitivity without instability.

Figure 9:
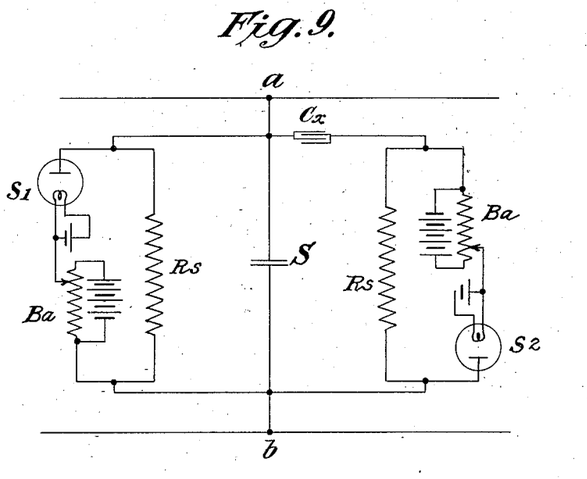

Another arrangement is shown in Fig. 9, in which the selector bulbs $S_1$, $S_2$ are connected across the baffle circuit points $a$, $b$, with their sensitizing batteries and potential adjusting means $B_a$. Resistances $R_s$, $R_s$ are shunted across each selector and sensitizing battery, these resistances being designed to permit the flow of the requisite small sensitizing current while preventing an excessive rush of current from the local battery when the selector is rendered highly conducting by a stray impulse. The magnitude of the resistances depends upon the particular selector used and the sensitivity desired. The reactive by-pass S here shown is a condenser, and in addition the stopping condenser $C_x$ is desirable, though not necessary, to permit independent adjustment of the selectors.

By suitable proportioning of the resistances and of the sensitizing electromotive force the sensitivity and conductivity of the bulb may be varied over wide limits. The temperature of the filament also has a large influence on the properties of the bulb. By suitably correlating these various factors almost any desired characteristic of the selector may be secured.

Figure 10:
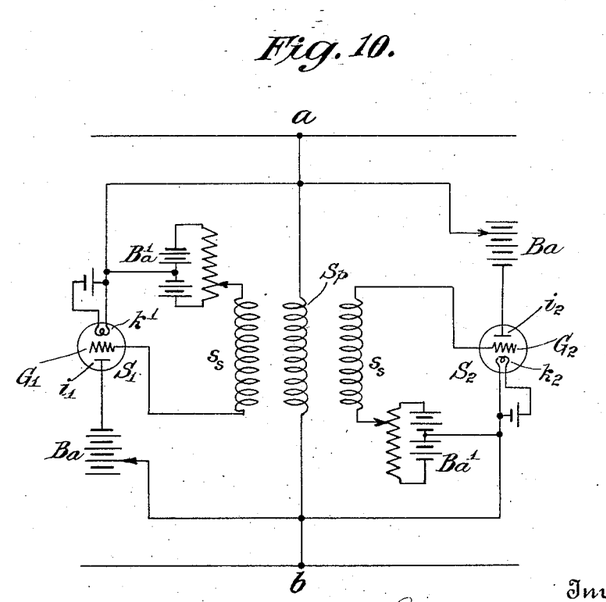

Fig. 10 shows an arrangement in which three-electrode thermionic bulbs are used, the control electrode of each bulb $G_1$, $G_2$ being connected across the secondary $s_s$ of a transformer, of which the reactive by-pass $s_p$ is the primary. The main anode $i_1$, $i_2$ and hot cathode $k_1$, $k_2$ are connected across the line directly, or through a sensitizing battery $B_a$. When shock oscillations occur in the by-pass primary $S_p$, they induce an electromotive force in the secondary $S_s$ which operates the control electrode to increase the conductivity of the bulb, which thus diverts the stray energy from the baffle circuit and limits the potential difference across $a$, $b$. In this arrangement, as in the arrangement of Fig. 9, I prefer to use selectors containing a certain amount of gas, preferably argon, to increase the conductivity and the sharpness of the selectivity. Either the main anode battery $B_a$ or the control anode battery $B_a'$ may be employed to produce the critical potential difference in the bulb, so that a very slight additional potential applied to the control electrode will cause a large increase in conductivity.

Having now described my invention what I claim and desire to secure by Letters Patent, is:

1. In a receiving system for radiant energy, an electromotive element, a baffle element tuned to the signal frequency, by-pass means including a reactance and an intensity selector cooperating to divert preferentially stray energy from the receiving system and a receiver associated with the baffle element, substantially as set forth.

2. In a receiving system for radiant energy, an electromotive element, a baffle element tuned to the signal frequency, a by-pass element having an impedance that is small with respect to the reactances of the baffle element, an intensity selector associated with said impedance and a receiver associated with the baffle element, substantially as set forth.

3. In a receiving system for radiant energy, an electromotive element, a baffle element tuned to the signal frequency and having large capacity and inductance reactances compared with those of the electromotive element, a by-pass element including an intensity selector and having an impedance that is small with respect to the reactances of the baffle element, and a receiver associated with the baffle element, substantially as set forth.

4. In a receiving system for radiant energy, an electromotive element, a receiver, a baffle element between the electromotive element and the receiver having a large energy storing capacity compared to that of the electromotive element, and a by-pass element acting preferentially to divert from the receiver and dissipate the energy of strays applied to the electromotive element but not to divert signal impulses, substantially as set forth.

5. In a receiving system for radiant energy, an electromotive element, a baffle element tuned to the signal frequency, and a by-pass element including an intensity selector having with the electromotive element a natural oscillation frequency different from that of the baffle element, substantially as set forth.

6. In a receiving system for radiant energy, an electromotive element, a receiving oscillating system including a baffle element tuned to the signal frequency, and a by-pass element having its electrical constants so chosen with respect to the constants of the electromotive element and the baffle element that its association with the electromotive element produces an oscillating system of a frequency different from the natural frequency of the electromotive element alone, while its association with the baffle element does not materially affect the frequency of the oscillating system including the baffle element, substantially as set forth.

7. In a receiving system for radiant energy, an electromotive element and a receiving oscillating system including a baffle element tuned to the signal frequency, a by-pass element having its electrical constants so chosen with respect to the constants of the electromotive element and the baffle element that its association with the electromotive element produces an oscillating system of a frequency different from the natural frequency of the electromotive element alone, while its association with the baffle element does not materially affect the frequency of the oscillating system including the baffle element, and an intensity selector associated with the by-pass element, substantially as set forth.

8. In a receiving system for radiant energy, an electromotive element, a baffle element tuned to the signal frequency having reactances that are large compared to those of the electromotive element, a by-pass element having a reactance that is small compared to those of the baffle element but material compared to those of the electromotive element, substantially as set forth.

9. In a receiving system for radiant energy, an electromotive element, a baffle element tuned to the signal frequency having reactances that are large compared to those of the electromotive element, a by-pass element having a reactance that is small compared to those of the baffle element but material compared to those of the electromotive element, and an intensity selector associated with the by-pass element, substantially as set forth.

10. In a receiving system for radiant energy, an electromotive element, a baffle element tuned to the signal frequency receiving signal energy from the electromotive element, means associated with the electromotive element for converting the energy of strays into currents of non-signal frequency, and means acting preferentially on the currents of non-signal frequency for dissipating the stray energy.

11. In a receiving system for radiant energy, an electromotive element tuned to the signal frequency, a baffle element also tuned to the signal frequency, receiving signal energy from the electromotive element, means associated with the electromotive element for converting the energy of strays into currents of non-signal frequency, and means acting preferentially on the current of non-signal frequency for dissipating the stray energy.

12. In a receiving system for radiant energy, an electromotive element, a baffle element tuned to the signal frequency, receiving signal energy from the electromotive element, means associated with the electromotive element for converting the energy of strays into currents of non-signal frequency, and intensity selective means associated therewith and adapted to divert such converted stray energy.

13. In a receiving system for radiant energy, an electromotive element tuned to the signal frequency, a baffle element also tuned to the signal frequency receiving signal energy from the electromotive element, means associated with the electromotive element for converting the energy of strays into currents of non-signal frequency, and intensity selective means associated therewith adapted to divert such converted stray energy.

14. In a receiving system for radiant energy, an electromotive element tuned to the signal frequency, a baffle element also tuned to the signal frequency but having a stiff oscillation characteristic compared with the electromotive element, a by-pass element having its electrical constants so chosen with respect to the constants of the electromotive element and the baffle element that its association with the electromotive element produces an oscillating system of a frequency different from the natural frequency of the electromotive element while its association with the baffle element does not materially affect the natural frequency of the oscillating system including the baffle element, substantially as set forth.

15. In a receiving system for radiant energy, a tuned element tuned to the signal frequency, a second tuned element also tuned to the signal frequency associated therewith and having large capacity and inductance reactances compared with those of the first tuned element, a by-pass element of small impedance compared to the reactances of the second element and connected thereto at points of small potential difference at the signal frequency, substantially as set forth.

16. In a receiving system for radiant energy, a tuned element tuned to the signal frequency, a second tuned element also tuned to the signal frequency associated therewith and having large capacity and inductance reactances compared with those of the first tuned element, a reactive by-pass element of small inpedance compared to the reactances of the second element and connected thereto at points of small potential difference at the signal frequency, substantially as set forth.

17. In a receiving system for radiant energy, an electromotive element tuned to the signal frequency, a baffle element also tuned to the signal frequency associated therewith and having large capacity and inductance reactances compared with the electromotive element, a reactive by-pass element including an intensity selector connected between the electromotive element and the baffle element at points of small potential difference at the signal frequency, substantially as set forth.

18. The method of selectively receiving radiant energy which consists in receiving the energy of signal frequency, converting stray energy into oscillations of non-signal frequency and diverting and dissipating this converted stray energy by preferential selection of its non-signal frequency, substantially as set forth.

19. The method of selectively receiving radiant energy which consists in receiving the energy of signal frequency, converting stray energy into oscillations of non-signal frequency and diverting and dissipating by intensity selection this converted stray energy, substantially as set forth.

20. The method of selectively receiving radiant energy which consists in receiving the energy of signal frequency, converting stray energy into oscillations of non-signal frequency and selectively dissipating this converted energy by intensity selection acting preferentially on its non-signal frequency, and receiving the undiverted signal energy, substantially as set forth.

21. In a receiving system for radiant energy, an electromotive element, a baffle element tuned to the signal frequency and having reactances large with respect to the reactance of the electromotive element, an intensity selector connected between the electromotive element and the baffle element at points of small potential difference for signal impulses but large potential difference for strays, substantially as set forth.

22. In a receiving system for radiant energy, an electromotive element, a baffle element tuned to the signal frequency and having reactances large with respect to the reactance of the electromotive element, a reactive by-pass element including an intensity selector connected between the collector element and the baffle element at points of small potential difference for signal impulses but large potential difference for strays, substantially as set forth.

23. In a receiving system for radiant energy, an electromotive element, a baffle element tuned to the signal frequency and having reactances large with respect to the reactance of the electromotive element, a by-pass element including an intensity selector, having a small impedance relative to the reactance of the baffle element, connected at points of small potential difference for signal impulses but large potential difference for strays, substantially as set forth.

24. In a receiving system for radiant energy, an electromotive element of high electrical mobility, a heavily loaded baffle element tuned to the signal frequency associated therewith, and a by-pass element acting preferentially to divert from the baffle element stray impulses received by the electromotive element, substantially as set forth.

25. In a receiving system for radiant energy, an electromotive element of high electrical mobility, a heavily loaded baffle element tuned to the signal frequency associated therewith, and a by-pass element acting preferentially to divert from the baffle element stray impulses received by the electromotive element, and including an intensity selector, substantially as set forth.

26. In a receiving system for radiant energy, an electromotive element of high electrical mobility, a receiving oscillating system including a heavily loaded baffle element tuned to the signal frequency associated therewith, and a by-pass element having its electrical constants so chosen with respect to the constants of the electromotive element and baffle element that its association with the electromotive element produces an oscillating system of frequency different from the natural frequency of the electromotive element alone, while its association with the baffle element does not materially affect the frequency of the oscillating system including the baffle element, substantially as set forth.

27. In a receiving system for radiant energy, an electromotive element of high electrical mobility, a heavily loaded baffle element tuned to the signal frequency associated therewith, a by-pass element forming with the electromotive element an oscillating system having a natural frequency for shock oscillations different from the signal frequency while not materially affecting the natural frequency of the baffle element, substantially as set forth.

28. In a receiving system for radiant energy, an electromotive element of high electrical mobility, a heavily loaded baffle element tuned to the signal frequency associated therewith, and a by-pass element adapted to divert from the baffle element and dissipate the energy of stray impulses at a frequency different from the signal frequency while not materially affecting the selectivity of the baffle element for signal impulses, substantially as set forth.

29. In a receiving system for radiant energy, an electromotive element, a baffle element tuned to the signal frequency, a by-pass element not materially diverting signal impulses, but diverting stray impulses at a frequency different from the signal frequency, and an intensity selector connected at points of small potential difference for signal frequency but relatively large potential difference for strays, substantially as set forth.

30. In a receiving system for radiant energy, an electromotive element, a baffle element tuned to the signal frequency receiving signal energy from the electromotive element, means for converting the energy of strays into currents of non-signal frequency, including a reactive by-pass element, and an intensity selector connected across the reactance of the by-pass element and in cooperation therewith acting preferentially to divert such converted stray energy, substantially as set forth.

31. In a receiving system for radiant energy, an electromotive element, a baffle element tuned to the signal frequency, a reactive by-pass element not materially diverting signal impulses but diverting stray impulses at a frequency different from the signal frequency, and an intensity selector associated with the reactance of the by-pass, and responsive to the large potential difference produced by strays traversing the by-pass but not responsive to the relatively small potential difference for signal impulses, substantially as set forth.

32. In a receiver for radiant energy, a complex oscillating system comprising a receiving portion responsive to the signal frequency, a stray diverting portion having a different preferential frequency, and an intensity selector co-operating with the frequency selective element to guard the receiving portion preferentially against stray impulses, substantially as set forth.

33. In a receiver for radiant energy, a complex oscillating system comprising a receiving portion having a stiff oscillation characteristic at the signal frequency, a more mobile portion having a different oscillation frequency, and an intensity selector guarding the receiving portion, substantially as set forth.

34. In a receiving system for radiant energy, an electromotive element, a receiving element responding freely to sustained impulses of signal frequency but less freely to other impulses, a stray dissipating element oscillating preferentially at a different frequency and an intensity selector co-operating with the frequency selective element to guard the receiving portion preferentially against stray impulses, substantially as set forth.

35. In a receiving system for radiant energy, a mobile electromotive element, a heavily loaded receiving element, a stray dissipating element including a reactance associated with the electromotive element and by this association modifying the frequency responsiveness of the electromotive element while not materially affecting the frequency responsiveness of the receiving element, substantially as set forth.

36. In a receiving system for radiant energy, a receiving element responsive to sustained signal impulses but sluggish in response to shocks, a mobile shock absorbing element associated therewith and an intensity selector acting preferentially in co-operation therewith to limit the amplitude of shock impulses, substantially as set forth.

37. In a receiving system for radiant energy, a frequency selective receiving circuit, a stray diverting circuit of non-signal frequency, and an intensity selective means co-operating with the stray diverting circuit to guard the signal circuit preferentially against stray impulses, substantially as set forth.

38. In a receiving system for radiant energy, a heavily loaded frequency selective receiving circuit, a lightly loaded stray diverting circuit of non-signal frequency, and intensity selective means for guarding the signal circuit against stray impulses, substantially as set forth.

39. In a receiving system for radiant energy, an electromotive element, a receiving element responsive to impulses of signal frequency, means for converting the energy of strays into oscillations of non-signal frequency, and means for limiting the intensity of non-signal impulses applied to the receiving element, substantially as set forth.

40. In a receiving system for radiant energy, an electromotive element, a receiving element responsive to impulses of signal frequency, means for converting the energy of strays into oscillations of non-signal frequency, and means for selectively limiting the intensity of non-signal impulses applied to the receiving element, substantially as set forth.

41. In a receiving system for radiant energy, a receiver responsive to sustained impulses of signal frequency, means for converting shock energy of strays into oscillations of non-signal frequency, a frequency selective element tuned to signal frequency, and an intensity selective means co-operating therewith to guard the receiver against the non-signal impulses, substantially as set forth.

42. In a system for separating mingled electrical impulses, an intensity selector comprising a thermionic valve, which has an anode and an incandescent cathode and contains an ionizable gas, and means for applying to the valve a sensitizing voltage just below the critical potential required to produce gas ionization, means for superimposing on the sensitizing voltage the mingled electrical impulses, and means cooperating with the intensity selector for discriminating between and separating the mingled electrical impulses.

43. In a system for separating mingled electrical impulses, an intensity selector comprising a thermionic valve, which has an anode and an incandescent cathode and contains an ionizable gas, and means for applying to the valve a sensitizing voltage just below the critical potential required to produce gas ionization, means for superimposing on the sensitizing voltage the mingled electrical impulses, and means cooperating with the intensity selector to enhance the intensity selective property thereof and to receive desired impulses while rejecting undesired impulses.

44. In an intensity selector for electrical impulses a thermionic valve having a sharply inflected current-electromotive force characteristic, a source of electromotive force for sensitizing the selector to or near the critical point, means for superimposing on the sensitizing electromotive force the impulses to be selectively transmitted, and means for preventing an excessive rush of current from the sensitizing source when the critical point is passed, substantially as set forth.

45. In a receiving system for radiant energy, an intensity selector comprising a thermionic device including a source of electrons and an ionizable gas, means for applying to the device a sensitizing electromotive force below the point of extensive ionization, a control electrode whereby impulses to be selectively conducted produce gas ionization and cause a large increase in conductivity of the gaseous medium, and a third electrode whereby this conductivity is utilized for the selective conduction of the impulses which causes the increase in conductivity, substantially as set forth.

This specification signed and witnessed this second day of August, 1919.

FREDERICK K. VREELAND.

Witnesses:
FRANK L. DYER,
C. D. JORDAN.